(12) United States Patent
Drummond

(10) Patent No.: US 12,221,149 B2
(45) Date of Patent: Feb. 11, 2025

(54) MOTORIZED RIDING STROLLER

(71) Applicant: Mary Drummond, Sun City Center, FL (US)

(72) Inventor: Mary Drummond, Sun City Center, FL (US)

( * ) Notice: Subject to any disclaimer, the term of this patent is extended or adjusted under 35 U.S.C. 154(b) by 37 days.

(21) Appl. No.: 18/150,599

(22) Filed: Jan. 5, 2023

(65) Prior Publication Data

US 2023/0211820 A1 Jul. 6, 2023

Related U.S. Application Data

(60) Provisional application No. 63/297,125, filed on Jan. 6, 2022.

(51) Int. Cl.
| | |
|---|---|
| *B62B 7/04* | (2006.01) |
| *B62B 5/00* | (2006.01) |
| *B62B 9/10* | (2006.01) |
| *B62B 9/12* | (2006.01) |
| *B62B 9/14* | (2006.01) |
| *B62B 9/20* | (2006.01) |

(52) U.S. Cl.
CPC ............ *B62B 7/044* (2013.01); *B62B 5/0036* (2013.01); *B62B 7/042* (2013.01); *B62B 9/102* (2013.01); *B62B 9/12* (2013.01); *B62B 9/14* (2013.01); *B62B 9/20* (2013.01)

(58) Field of Classification Search
CPC .................................................. B62B 5/0033
See application file for complete search history.

(56) References Cited

U.S. PATENT DOCUMENTS

| | | | |
|---|---|---|---|
| D321,851 S | 11/1991 | Louszko, Jr. | |
| 6,148,942 A | 11/2000 | Mackert | |
| 6,360,836 B1 | 3/2002 | Milano, Jr. et al. | |
| 6,443,252 B1 | 9/2002 | Andes | |
| 7,004,272 B1 | 2/2006 | Brown et al. | |
| 7,490,684 B2 | 2/2009 | Seymour et al. | |
| 10,913,479 B1 | 2/2021 | Cardentey | |
| 11,447,168 B1 * | 9/2022 | Ferrer | B62B 9/20 |
| 2007/0126195 A1 * | 6/2007 | Dresher | B62B 9/20 |
| | | | 280/47.38 |

(Continued)

FOREIGN PATENT DOCUMENTS

| | | | |
|---|---|---|---|
| CN | 115551763 A | * | 12/2022 |
| EP | 3599143 A1 | | 1/2020 |

*Primary Examiner* — Barry Gooden, Jr.
(74) *Attorney, Agent, or Firm* — Boudwin Intellectual Property Law, LLC

(57) ABSTRACT

A motorized riding stroller is provided including a frame having a base platform, a handlebar, and a plurality of legs, wherein the plurality of legs extend from a lower surface of the base platform. The handlebar is pivotally affixed to a rear side of the base platform. An interchangeable seat is removably securable to an upper surface of the base platform. A standing platform is disposed between a pair of rear legs, wherein the pair of rear legs are disposed on opposing lateral sides of the base platform along a rear side thereof. A wheel is affixed to a distal end of each leg of the plurality of legs, wherein each wheel is operably connected to a motor disposed within an interior of the frame. The wheels rotate upon actuation of a drive control disposed on the handlebar, such that the stroller can move in opposing directions.

17 Claims, 5 Drawing Sheets

(56) References Cited

U.S. PATENT DOCUMENTS

| | | | |
|---|---|---|---|
| 2013/0154240 A1* | 6/2013 | Yi | B62B 7/044 |
| | | | 280/649 |
| 2016/0101803 A1* | 4/2016 | Ahlemeier | B62B 9/08 |
| | | | 180/167 |
| 2022/0212706 A1* | 7/2022 | Jones | B60L 15/20 |
| 2023/0094092 A1* | 3/2023 | Showell | B62B 9/102 |
| | | | 280/47.38 |
| 2023/0202547 A1* | 6/2023 | Tutt | B62B 7/044 |
| | | | 280/47.38 |
| 2023/0211820 A1* | 7/2023 | Drummond | B62B 7/044 |
| | | | 180/216 |

* cited by examiner

MOTORIZED RIDING STROLLER

CROSS REFERENCE TO RELATED APPLICATIONS

This application claims the benefit of U.S. Provisional Application No. 63/297,125 filed on Jan. 6, 2022. The above identified patent application is herein incorporated by reference in its entirety to provide continuity of disclosure.

BACKGROUND OF THE INVENTION

The present invention relates to motorized strollers. More particularly, the present invention pertains to a motorized stroller having a riding platform capable of supporting a user, such that the user may ride along with the motorized stroller.

Many parents and guardians enjoy going for walks with their small children. Typically, the small child will be placed within a stroller and the parent or guardian will push the stroller while they walk. Parents traveling without a stroller may have to carry their child. However, carrying a child for extended periods can be exhausting. Additionally, pushing a child in a stroller is a good way to bond with the child outside when they may be too young to walk or unwilling to walk for extended periods. Commonly used strollers must be manually operated, which may require a significant effort from the parent or guardian, particularly if they are pushing the stroller uphill. This level of activity may be too strenuous for elderly caregivers who wish to take the small child out for a walk, particularly for those with limited strength or dexterity. Attempting to push a stroller while limited in this way can further result in losing control of the stroller, which may in turn cause the child to fall from the stroller or otherwise become injured. Furthermore, individuals pushing the stroller may wish to have a convenient method to travel to a desired destination faster than pushing would allow. In order to address these concerns, the present invention will provide users with an improved stroller equipped with a motor that facilitates automatic movement and allows parents or guardians to rid on a standing platform located on a rear side of the stroller.

In light of the devices disclosed in the known art, it is submitted that the present invention substantially diverges in design elements from the known art and consequently it is clear that there is a need in the art for an improvement to existing motorized strollers. In this regard, the instant invention substantially fulfills these needs.

SUMMARY OF THE INVENTION

In view of the foregoing disadvantages inherent in the known types of motorized strollers now present in the known art, the present invention provides a motorized riding stroller wherein the same can be utilized for providing convenience for the user when transporting a child or infant.

The present system comprises a frame having a base platform, a handlebar, and a plurality of legs, wherein the plurality of legs extend from a lower surface of the base platform. The handlebar is pivotally affixed to the rear side of the base platform. An interchangeable seat is removably securable to an upper surface of the base platform. A standing platform is disposed between a pair of rear legs of the plurality of legs, wherein the pair of rear legs are disposed on opposing lateral sides of the rear side of the base platform. A wheel is affixed to a distal end of each of the plurality of legs, wherein each wheel is operably connected to a motor disposed within an interior of the frame. A drive control is operably connected to the motor, wherein the drive control can be actuated in a first direction and a second direction. The drive control is configured to selectively activate the motor when actuated, whereupon activation of the motor, each wheel rotates in a direction corresponding to one of the first direction and the second direction.

In some embodiments, a front leg of the plurality of legs is centrally disposed on a front side of the base platform. In another embodiment a storage basket is affixed to the lower surface of the base platform. In other embodiments, the storage basket comprises a flexible netting. In yet another embodiment, a shaft of the handlebar is telescopically adjustable in length. In some embodiments, the shaft comprises a pair of parallel shaft portions. In another embodiment, a grasping portion of the handlebar comprises a ring affixed to an upper end of each shaft portion of the handlebar. In other embodiments, at least one cup holder is disposed along the handlebar. In yet another embodiment, the standing platform is pivotally affixed between the pair of rear legs, such that the standing platform can selectively move between a raised position and a lowered position, wherein the standing platform rests substantially parallel to the base platform when in the lowered position. In some embodiments, the standing platform is operably connected to a standing platform motor, whereupon actuation of the standing platform motor, the platform selectively moves between the raised position and the lowered position. In another embodiment, the interchangeable seat is selected from a group consisting of: a bassinet, an infant car seat, and a stroller seat. In other embodiments, the interchangeable seat includes a shade affixed thereto. In yet another embodiment, the bassinet comprises a plurality of sidewalls extending from a base of the bassinet defining an interior volume, wherein a shade is affixed to the plurality of sidewalls. In some embodiments, the interchangeable seat further comprises a seatbelt configured to retain a passenger within the interchangeable seat. In another embodiment, the base platform is slidably affixed to the frame, such that a position of the base platform relative to the handlebar is adjustable. In other embodiments, a brake control is disposed on the handlebar, wherein the brake control is configured to actuate a brake operably connected to each wheel. In yet another embodiment, at least one wheel is configured to rotate about a vertical axis corresponding to actuation of a directional control disposed on the handlebar. In some embodiments, the direction control is actuated upon lateral movement of the handlebar relative to the base platform.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
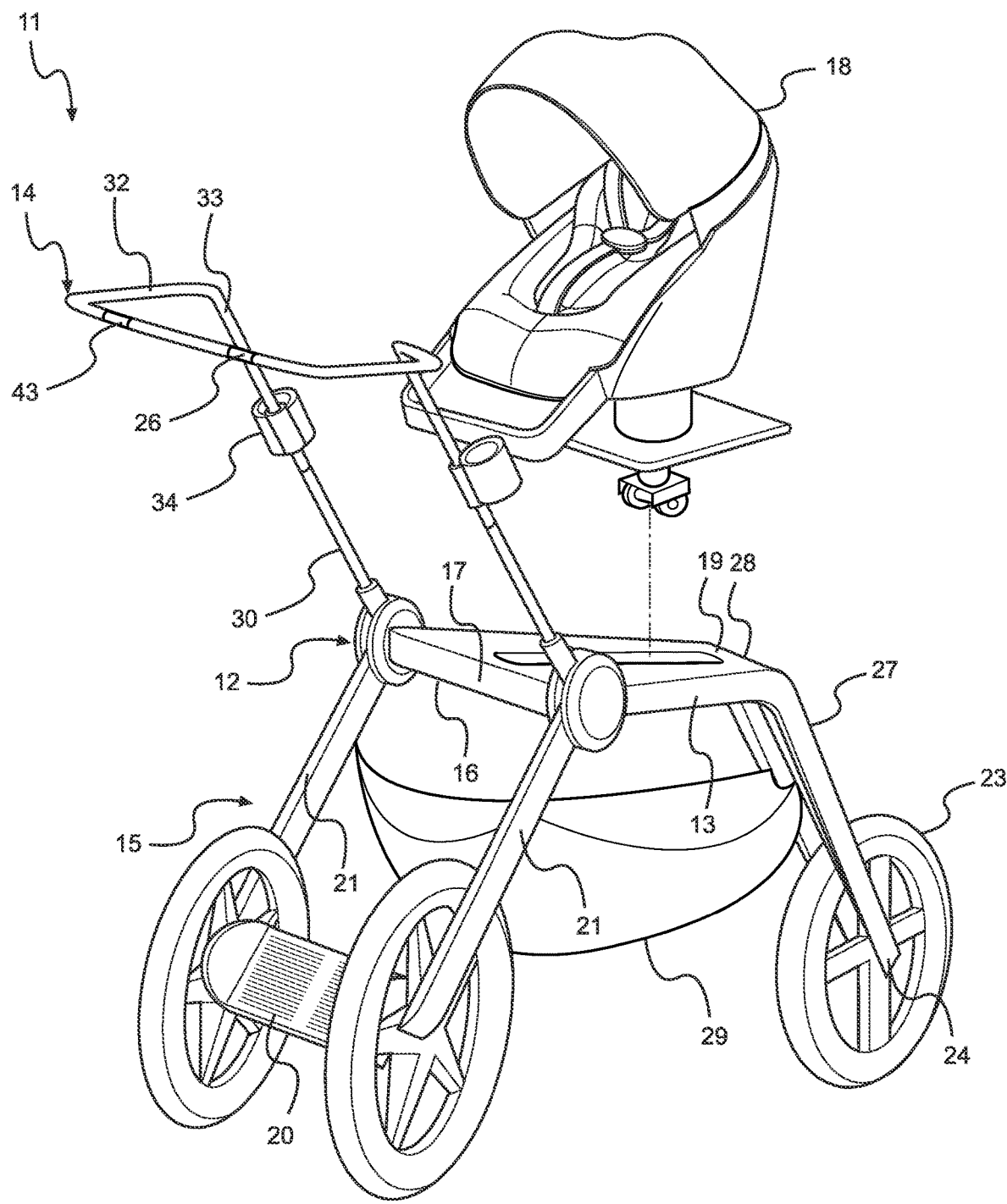
FIG. 1 shows a perspective view of an embodiment of the motorized riding stroller.

Reference is made herein to the attached drawings. Like reference numerals are used throughout the drawings to depict like or similar elements of the motorized riding stroller. The figures are intended for representative purposes only and should not be considered to be limiting in any respect.

Figure 4:
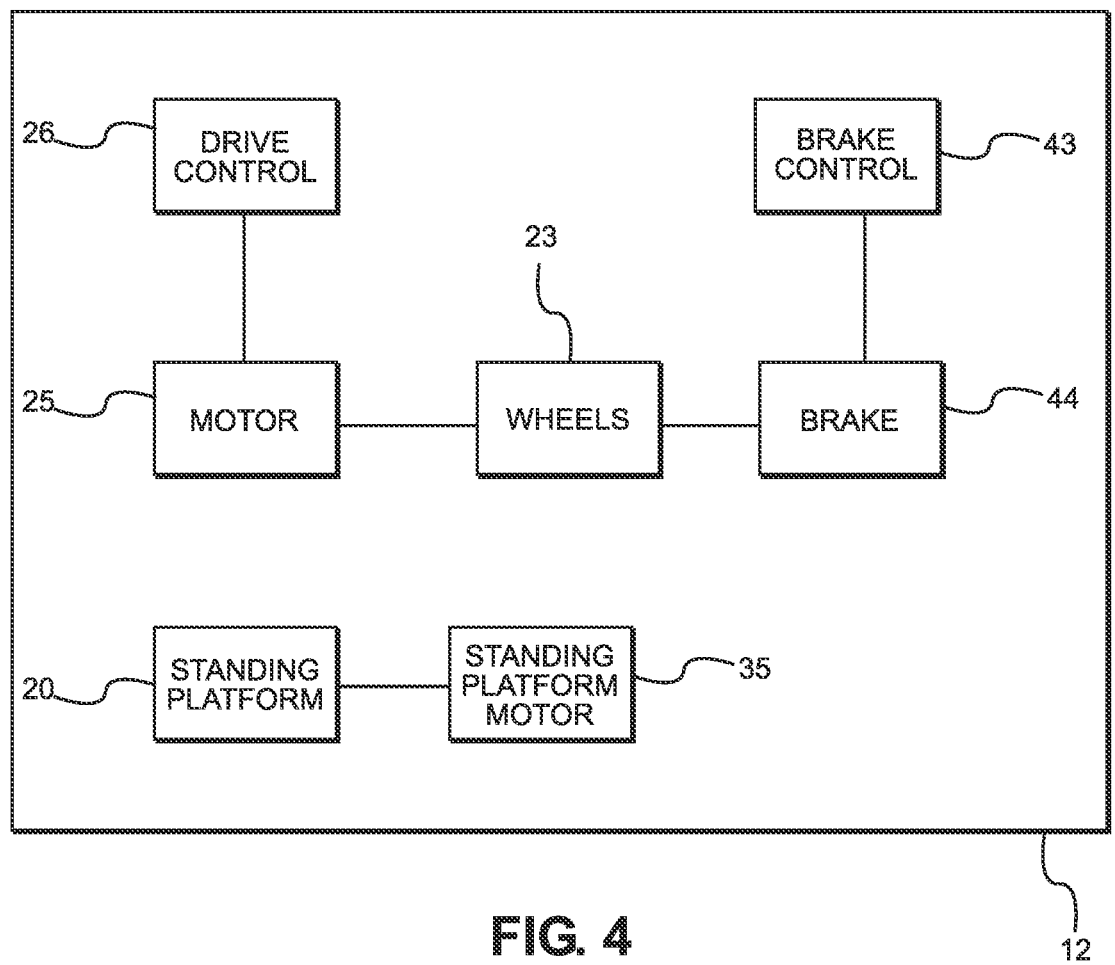
FIG. 4 shows a schematic view of an embodiment of the motorized riding stroller.

Referring now to FIG. 1, there is shown a perspective view of an embodiment of the motorized riding stroller. The motorized riding stroller 11 comprises a frame 12 having a base platform 13, a handlebar 14, and a plurality of legs 15 affixed to a lower surface 16 of the base platform 13. The plurality of legs 15 include a pair of rear legs 21 affixed to a rear side 17 of the base platform 13 and, in the illustrated embodiment, include a front leg 27 disposed centrally along a front side 28 of the base platform 13. In alternate embodiments, the motorized riding stroller 11 comprises four legs evenly distributed across the base platform 13, or any other distribution of legs as desired. A wheel 23 is disposed on a distal end 24 of each leg of the plurality of legs 15, wherein the wheel 23 is operably connected to a motor (as shown in FIG. 4, 25) disposed within an interior of the frame 12. In this manner, upon actuation of the motor, each wheel 23 is configured to rotate to drive the motorized riding stroller 11 in a desired direction. A standing platform 20 is disposed between the pair of rear legs 21, wherein the standing platform 20 is configured to receive the user thereon. In this manner, the user can ride the motorized riding stroller 11 to a desired destination while transporting a child therein. In the illustrated embodiment, a storage basket 29 is affixed to the base platform 13 along the lower surface 16 thereof, wherein the storage basket 29 defines an interior volume into which various items can be placed. In some embodiments, the storage basket 29 comprises a mesh netting, wherein the mesh netting comprises elastic material biased towards the lower surface 16 to retain items against the base platform 13 when placed within the storage basket 29.

An interchangeable seat 18 is removably securable to an upper surface 19 of the base platform 13. The interchangeable seat 18 is contemplated to comprise a variety of different seating styles and designs, such as, but not limited to, infant and child car seats, stroller seats, and bassinets. The interchangeable seat 18 comprises a securement mechanism capable of removably securing the interchangeable seat 18 to the base platform 13. In some embodiments, the securement mechanism comprises an interlocking track system, fasteners, clamps, latches, or the like capable of retaining the interchangeable seat 18 on the base platform 13. In some embodiments, the securing mechanism comprises a universal securement mechanism compatible with existing car and stroller seats. In some embodiments, the interchangeable seat 18 is rotatably affixed to the base platform 13 via a cylindrical shaft to facilitate rotation of the interchangeable seat 18 while affixed to the frame 12. In this manner, a user can selectively position the interchangeable seat 18 to face in a direction of the handlebar 14 or in a direction away from the handlebar 14. In the illustrated embodiment, the interchangeable seat 18 is slidably adjustable along the base platform 13, such that a distance between the handlebar 14 and the interchangeable seat 18 can be adjusted to accommodate seats of varying sizes and styles.

The handlebar 14 is affixed to the upper surface 19 of the base platform 13 along the rear side 17. The handlebar 14 is pivotally affixed and adjustable relative to the base platform 13 to allow the user to position the handlebar 14 in a comfortable location for the user. As such, the handlebar 14 can pivot forward, backward, and laterally as desired to increase user comfort and safety during use. In the illustrated embodiment, the handlebar 14 comprises a shaft 30 affixed to the base platform 13 and a grasping portion 32 disposed at an upper end 33 of the shaft 30. In the illustrated embodiment, the shaft 30 is telescopically adjustable in length, such that the user can position the grasping portion 32 at a comfortable height. In such embodiments, the shaft 30 may further include a plurality of apertures therethrough, wherein a spring-biased detent can extend through one of the plurality of apertures to lock the shaft 30 at a desired length. Furthermore, in the shown embodiment, the shaft 30 comprises a pair of parallel shaft portions 31. In such embodiments, each shaft portion 31 is independently telescopically adjustable as previously discussed. In the shown embodiment, the grasping portion 32 comprises a ring extending between the upper end 33 of each shaft portion 31, defining an open circle. In the shown embodiment, at least one cup holder 34 is affixed along the length of the shaft 30, wherein the cup holder 34 is configured to retain a beverage container therein.

A drive control is disposed on the handlebar 14, wherein the drive control 26 is configured to selectively activate the motor to engage the wheels 23 to drive the motorized riding stroller 11 in a desired direction. The drive control 26 is further configured to selectively actuate the wheels 23 in a first direction and a second direction, such that the motorized riding stroller 11 is capable of forward and reverse motion. The drive control 26 is contemplated to include a bidirectional switch selectively movable between a first position corresponding to the first direction, a second position corresponding to the second direction, and a neutral position, wherein the neutral position the motor is disengaged. Alternatively, the drive control 26 is contemplated to include a throttle control, similar to a motorcycle, or be tied to the pivotable nature of the handlebar 14. For example, the drive control 26 can be configured to actuate the motor in the first direction when the handlebar 14 is pivoted forward and the second direction when the handlebar 14 is pivoted rearward. Additionally, one or more wheels 23 can be pivotably affixed and operably connected to the handlebar 14, such that upon twisting the grasping portion 32 left or right, or upon lateral pivoting of the handlebar 14, the wheel 23 rotates in a corresponding direction to reorient the motorized riding stroller 11 in a desired direction. Furthermore, in such embodiments, a brake control 43 is disposed on the handlebar 14, wherein the brake control 43 is configured to selectively actuate a brake 44 on one or more wheels 23, such that upon actuation of the brake 44, the wheel 23 is prevented from rotating, thereby bringing the motorized riding stroller 11 to rest.

Figure 2A:
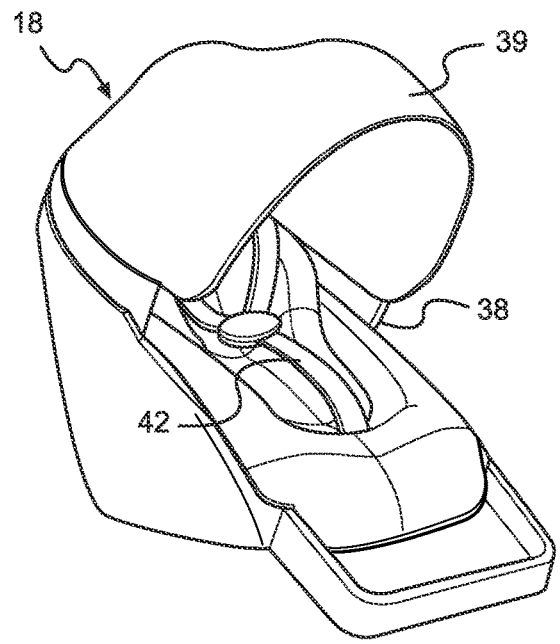
FIG. 2A shows a perspective view of the stroller seat of an embodiment of the motorized riding stroller.
Figure 2B:
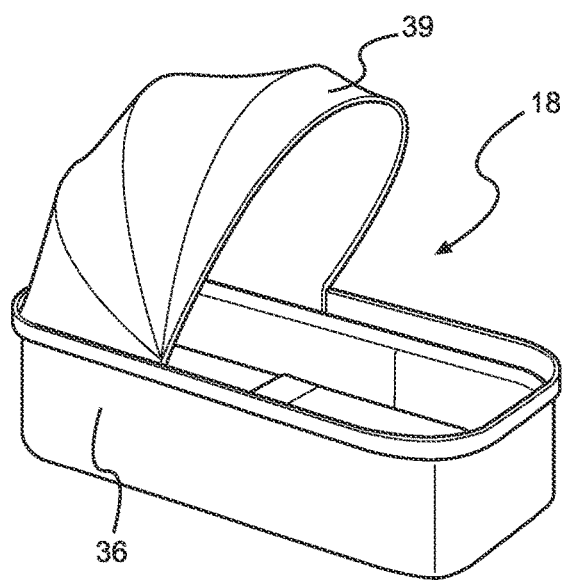
FIG. 2B shows a perspective view of the bassinet of an embodiment of the motorized riding stroller.
Figure 2C:
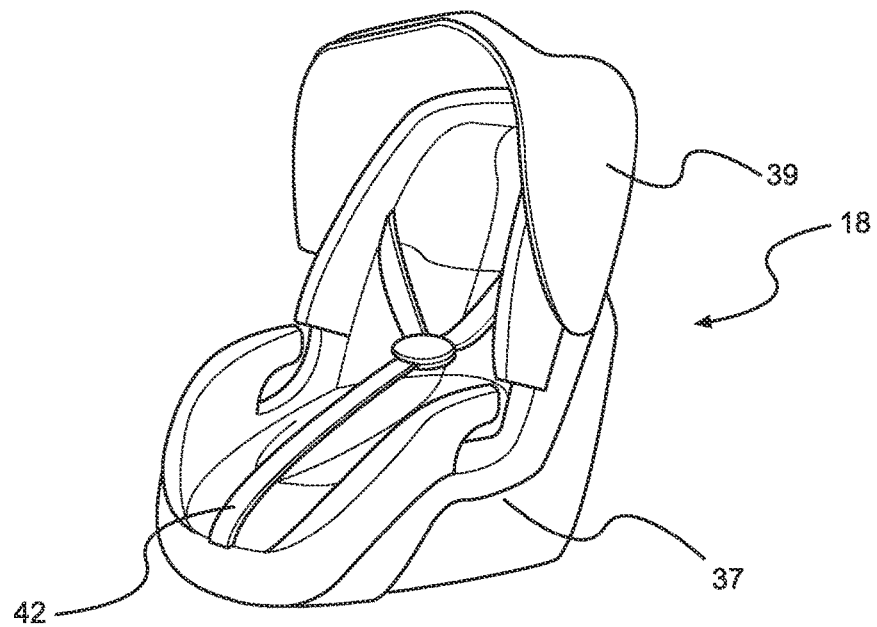
FIG. 2C shows a perspective view of the infant car seat of an embodiment of the motorized riding stroller.

Referring now to FIGS. 2A, 2B, and 2C, there are shown perspective views of the interchangeable seats of an embodiment of the motorized riding stroller. The interchangeable seat 18 is configured to removably secure to the base platform of the frame, such that the user can select an appropriate seat as their child grows or for use with another child. In the illustrated embodiment, the interchangeable seat 18 comprises one or more of a bassinet 36 configured for use with an infant in a supine position, an infant or child car seat 37 for use with a child in a seated position, and a stroller seat 38 designed for use with a toddler or other larger child. Each interchangeable seat 18 may further include a seatbelt 42 thereon, wherein the seatbelt 42 is configured to retain the passenger in the interchangeable seat 18. In the shown embodiment, the bassinet 36 comprises a plurality of sidewalls affixed about a base, defining an interior volume dimensioned to receive an infant in a horizontal position. In the illustrated embodiment, the stroller seat 38 includes a footrest portion to prevent the child's feet from dangling during use. In some embodiments, a shade 39 is affixed to the interchangeable seat 18 and is configured to overhang over the interchangeable seat 18 to shield the passenger from the sun. In some such embodiments, the shade 39 is pivotally affixed to the interchangeable seat 18 such that the shade 39 can be selectively moved between a raised position and a lowered position as needed. As shown in FIG. 2B, the shade 39 of the bassinet 36 comprises a plurality of ribs therein pivotally affixed to the sidewalls of the bassinet 36, such that the shade 39 is provided additional structural integrity to support extended coverage.

Figure 3:
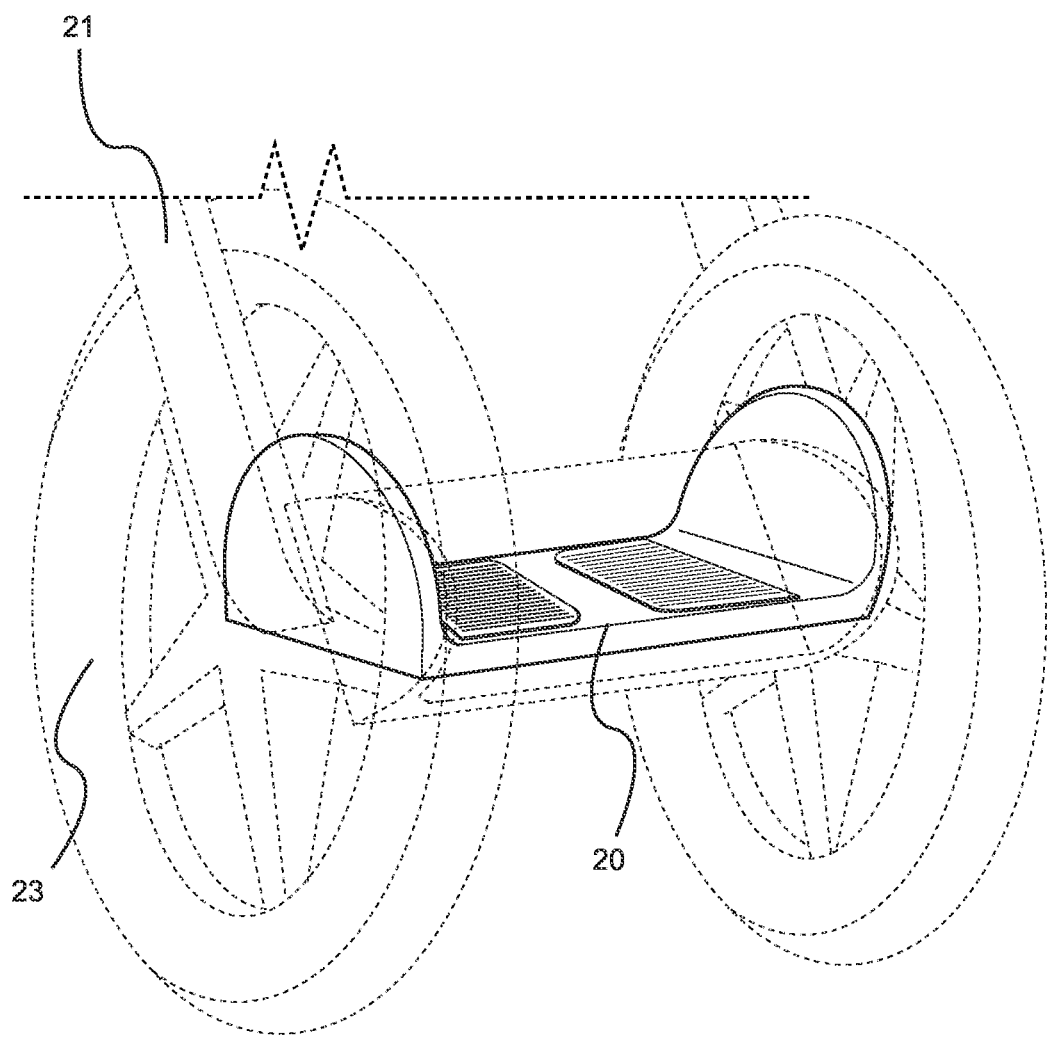
FIG. 3 shows a close-up view of the standing platform of an embodiment of the motorized riding stroller.

Referring now to FIG. 3, there is shown a close-up view of the standing platform of an embodiment of the motorized riding stroller. In the illustrated embodiment, the standing platform 20 is pivotably affixed to the pair of rear legs 21, such that the standing platform 20 is selectively movable between a raised position and a lowered position. In some embodiments, the standing platform 20 is hingedly affixed along a front edge thereof to a platform support, however, in the illustrated embodiment, the standing platform 20 is pivotally affixed to an interior surface of each wheel 23. In such embodiments, the standing platform 20 rotates about a longitudinal axis thereof to selectively move between the raised position and the lowered position. The standing platform 20 may be selectively moved between the raised and lowered positions manually, or alternatively, automatically via a standing platform motor (as shown in FIG. 4, 35). In the lowered position, the standing platform 20 is parallel to the base platform of the frame, such that the user can stand on the upper surface of the standing platform 20, whereas, in the raised position, the standing platform 20 is perpendicular to the base platform, such that the standing platform 20 is positioned to minimize user contact therewith when pushing the motorized riding stroller manually. In some embodiments, the upper surface of the standing platform 20 further comprises a pair of footwells dimensioned to each receive an individual foot thereon on opposing sides of a central raised portion. In this manner, the standing platform 20 is dimensioned to retain the feet of the user thereon, while preventing sliding or lateral movement of the user's feet while thereon. In the shown embodiment, the upper surface of the standing platform 20 comprises a pair of textured surfaces configured to increase the surface area of the upper surface in contact with the user's feet, such that frictional engagement with the user's feet is increased during use. Similarly, in some embodiments, the upper surface comprises a rubber coating thereon to increase frictional engagement with the user's feet.

Referring now to FIG. 4, there is shown a schematic view of an embodiment of the motorized riding stroller. The motor 25 is disposed within the frame 12, wherein the motor 25 is operably connected to each wheel 23 and the drive control 26. When the drive control 26 is actuated, the motor 25 is configured to drive the wheels 23 in either a first direction or a second direction, wherein the first and second directions correspond to forward and reverse, respectively. This direction corresponds to the direction of actuation of the drive control 26 as previously described. The wheels 23 may be halted by actuating a brake 44 associated with each wheel 23, wherein the brake 44 is engaged upon actuation of a brake control 43 disposed on the frame 12. Generally, the brake control 43, the drive control 26, and any additional controls for operation of the motorized riding stroller are disposed on the grasping portion of the handlebar, such that the controls are within easy reach of the user. The standing platform 20 can further be automatically deployed between a raised position and a lowered position via actuation of a standing platform motor 35. The standing platform motor 35 may be actuated via an associated control disposed on the grasping portion, or alternatively, automatically deploy upon actuation of a proximity sensor detecting the presence of a user's foot in proximity to the standing platform 20.

Figure 5:
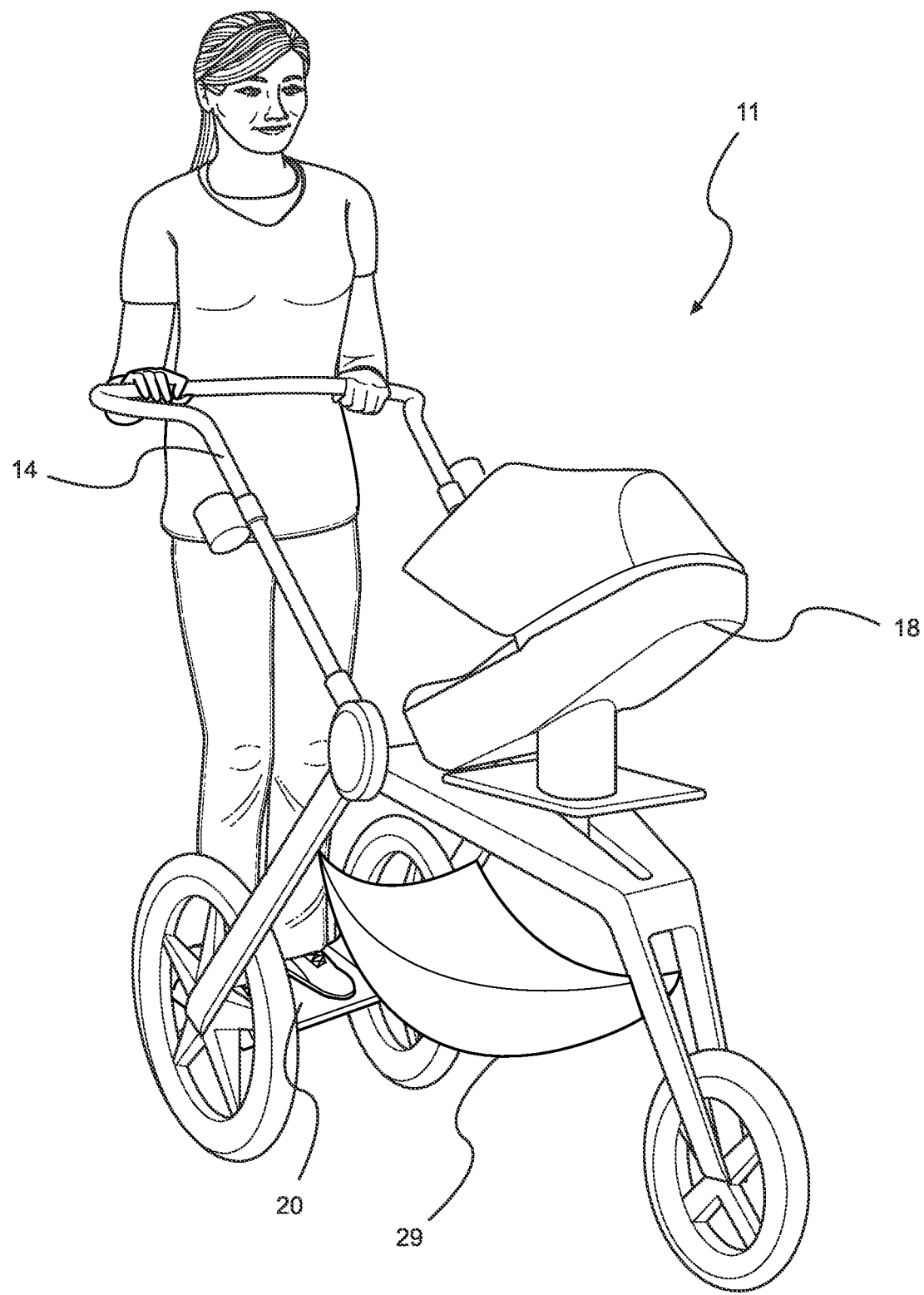
FIG. 5 shows a perspective view of an embodiment of the motorized riding stroller in use.

Referring now to FIG. 5, there is shown a perspective view of an embodiment of the motorized riding stroller in use. In one use, the appropriate interchangeable seat 18 is selected corresponding to the passenger's age or size and affixed to the base platform. The passenger is then secured in the interchangeable seat 18. The user can then push the motorized riding stroller 11 manually, or alternatively, lower the standing platform 20 and stand thereon. Once supported on the standing platform 20, the user can activate the motor via the drive control to drive the motorized riding stroller 11 in a desired direction. The user can select forward or reverse direction, or alternatively left or right motion by actuating the handlebar 14 in a corresponding direction. Should the user wish to stop the stroller, the user can actuate the brake control to engage the brakes on the wheels. Additionally, items can further be stored within the storage basket 29.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:
1. A motorized riding stroller, comprising:
   a frame having a base platform, a handlebar, and a plurality of legs;
   wherein the plurality of legs extend from a lower surface of the base platform;
   wherein the handlebar is pivotally affixed to a rear side of the base platform;
   an interchangeable seat removably securable to an upper surface of the base platform;
   a standing platform disposed between a pair of rear legs of the plurality of legs;
   wherein the pair of rear legs are disposed on opposing lateral sides of the base platform along a rear side thereof;

a wheel affixed to a distal end of each leg of the plurality of legs;

wherein each said wheel is operably connected to a motor disposed within an interior of the frame;

a drive control operably connected to the motor, wherein the drive control is actuated in a first direction and a second direction;

wherein the drive control is configured to selectively activate the motor when actuated;

whereupon activation of the motor, each said wheel rotates in a direction corresponding to one of the first direction and the second direction; and wherein the standing platform is pivotally affixed between the pair of rear legs, such that the standing platform is selectively movable between a raised position and a lowered position, wherein the standing platform rests substantially parallel to the base platform when in the lowered position.

2. The motorized riding stroller of claim 1, further comprising a front leg of the plurality of legs, wherein the front leg is centrally disposed on a front side of the base platform.

3. The motorized riding stroller of claim 1, further comprising a storage basket affixed to the lower surface of the base platform.

4. The motorized riding stroller of claim 3, wherein the storage basket includes flexible netting.

5. The motorized riding stroller of claim 1, wherein a shaft of the handlebar is telescopically adjustable in length.

6. The motorized riding stroller of claim 5, wherein the shaft includes a pair of parallel shaft portions.

7. The motorized riding stroller of claim 6, wherein a grasping portion of the handlebar includes a ring affixed to an upper end of each shaft portion of the handlebar.

8. The motorized riding stroller of claim 1, further comprising at least one cup holder disposed along the handlebar.

9. The motorized riding stroller of claim 1, wherein the standing platform is operably connected to a standing platform motor, whereupon actuation of the standing platform motor, the platform selectively moves between the raised position and the lowered position.

10. The motorized riding stroller of claim 1, wherein the interchangeable seat is selected from a group consisting of a bassinet, an infant car seat, or a stroller seat.

11. The motorized riding stroller of claim 1, wherein the interchangeable seat further comprises a shade affixed thereto.

12. The motorized riding stroller of claim 11, wherein the bassinet includes a plurality of sidewalls extending from a base of the bassinet defining an interior volume, wherein the shade is affixed to the plurality of sidewalls.

13. The motorized riding stroller of claim 1, wherein the interchangeable seat further comprises a seatbelt configured to retain the passenger within the interchangeable seat.

14. The motorized riding stroller of claim 1, wherein the base platform is slidably affixed to the frame, such that a position of the base platform relative to the handlebar is adjustable.

15. The motorized riding stroller of claim 1, further comprising a brake control disposed on the handlebar, wherein the brake control is configured to actuate a brake operably connected to each said wheel.

16. The motorized riding stroller of claim 1, wherein at least one of said wheels is configured to rotate about a vertical axis corresponding to actuation of a directional control disposed on the handlebar.

17. The motorized riding stroller of claim 16, wherein the directional control is actuated upon lateral movement of the handlebar relative to the base platform.

\* \* \* \* \*